United States Patent [19]

Johansson

[11] Patent Number: 4,621,726
[45] Date of Patent: Nov. 11, 1986

[54] SEALING DEVICE FOR RELATIVELY ROTATING SURFACES IN A CONVEYOR

[75] Inventor: Arne V. Johansson, Höganäs, Sweden

[73] Assignee: AB Siwertell, Bjuv, Sweden

[21] Appl. No.: 586,208

[22] Filed: Mar. 5, 1984

[30] Foreign Application Priority Data

Mar. 10, 1983 [SE] Sweden .............................. 8301296

[51] Int. Cl.⁴ ............................................ B65G 33/00
[52] U.S. Cl. ..................................... 198/671; 198/658
[58] Field of Search ............... 198/670, 671, 658, 518, 198/672

[56] References Cited

U.S. PATENT DOCUMENTS

| | | | |
|---|---|---|---|
| 745,439 | 12/1903 | Holcomb et al. | 198/658 |
| 2,038,904 | 4/1936 | Rand | 198/671 |
| 3,220,539 | 11/1965 | Anagnos | 198/658 |
| 3,333,679 | 8/1967 | Zimmermann et al. | 198/670 |
| 3,685,638 | 8/1972 | Siwersson et al. | 198/671 |

FOREIGN PATENT DOCUMENTS 1034480 3/1951 France ................................ 198/658

Primary Examiner—Joseph E. Valenza
Assistant Examiner—Kyle E. Shane
Attorney, Agent, or Firm—Browdy and Neimark

[57] ABSTRACT

A sealing device for sealing between two relatively rotating cylindrical surfaces in a conveyor has its one cylindrical surface formed as a stationary wall portion in a transition housing and its other cylindrical surface formed as a cylindrical wall portion of a rotating bottom in said transition housing, one of said cylindrical surfaces being provided with at least one scraper and/or impeller blade acting against the other of said cylindrical surfaces in order to feed material, during operation, in a direction into the interior of the conveyor, thereby to reduce the tendency of the bulk goods to penetrate between and cause wear of said two cylindrical surfaces.

4 Claims, 3 Drawing Figures

SEALING DEVICE FOR RELATIVELY ROTATING SURFACES IN A CONVEYOR

In connection with conveyors, in particular screw conveyors, it is frequently necessary to transfer bulk goods from one portion of the conveyor to another, for example when grain is to be raised from the bottom part of a silo by means of a screw conveyor. In one such case, use may be made of screw conveyors having a feeder of known type, for instance in accordance with U.S. Pat. Nos. 3,685,638 and 3,596,751 of Siwersson et al. The first-mentioned patent specification describes a co-rotating feeder, i.e. the rotary parts of the feeder are rigidly mounted on the screw conveyor shaft for rotation together therewith. The last-mentioned patent describes a feeder, the rotary parts of which are rotated independently of the screw conveyor screw and in a direction opposite to the direction of rotation thereof. If such feeders are introduced into a cylindrical housing portion into which the bulk goods are flowing or introduced, the sealing between said cylindrical wall portion and the rotating feeder frequently causes difficulties. By the rotation of the feeder, the bulk goods will be flung against the cylindrical wall portion and tend to penetrate into the gap between the cylindrical circumference of the feeder and the cylindrical wall portion and may cause seizing and friction losses which, again, may result in power loss. The penetration of the bulk goods causes heavy wear and leakage so that the bulk goods can depart through the gap between the cylindrical wall portion and the cylindrical surface of the feeder. It has therefore been tried, in different ways, to establish a seal between these two relatively rotating surfaces. Known devices, such as rubber seals or labyrinth seals, for sealing between these surfaces have proved unsatisfactory.

British patent specification No. 576,504 describes screw conveyor which is provided at one end with a portion of opposite pitch to provide for agitation, the bearing end of the screw shaft within a portion between two shaft bearings having a screw portion for discharging fine-grained material at the shaft end or through an outlet hole for the fine-grained material. However, this construction cannot be used for solving the problems encountered in transition housings between a feeder to a screw conveyor and a supply pipe or storage bin, and this applies also to the construction according to U.S. patent specification No. 3,896,923 in which the feed screw proper is provided at its end with a portion of opposite pitch to provide for positive discharge of the conveyed goods through an outlet pipe connected to the screw conveyor jacket.

It is the object of the present invention to reduce these shortcomings of prior art sealing devices, and this and other objects of the invention are achieved by designing the sealing device in the manner defined by the appended claims. In the sealing device according to the invention, one cylindrical surface forms a stationary wall portion in a transition housing and the other cylindrical surface forms a cylindrical wall portion on a rotary bottom within the transition housing. Furthermore, the sealing device comprises at least one scraper and/or impeller blade formed or mounted on one of said cylindrical surfaces and adapted, during operation, to act against the other of said cylindrical surfaces and to feed the material into the conveyor. In this manner, the scraper and/or impeller blade which preferably is mounted on the rotary cylindrical surface since this will give the best results, will operate in the manner of a feed screw (when large quantities of material have piled up) and, possibly, also as an impeller blowing away all dust-laden material and finer dust from the gap between the two cylindrical surfaces. The rotary bottom may be mounted on the rotary shaft of the conveyor for rotation together therewith and may thus form a co-rotating feeder. However, it may also be mounted on a separately rotating feeder which is rotated in a direction opposite to the rotation of the conveyor screw. The sealing device is here utilized in connection with a counterrotating feeder.

In order to improve the dynamic balance of the device, the cylindrical surface preferably is provided with more than one scraper or screw blade which are uniformly distributed circumferentially, for example two screw blades starting at diametrically opposite points on said cylindrical surface.

An embodiment of a sealing device according to the present invention, used together with a co-rotating feeder to a screw conveyor, will be described in detail below, reference being had to the accompanying drawings in which.

Figure 1:
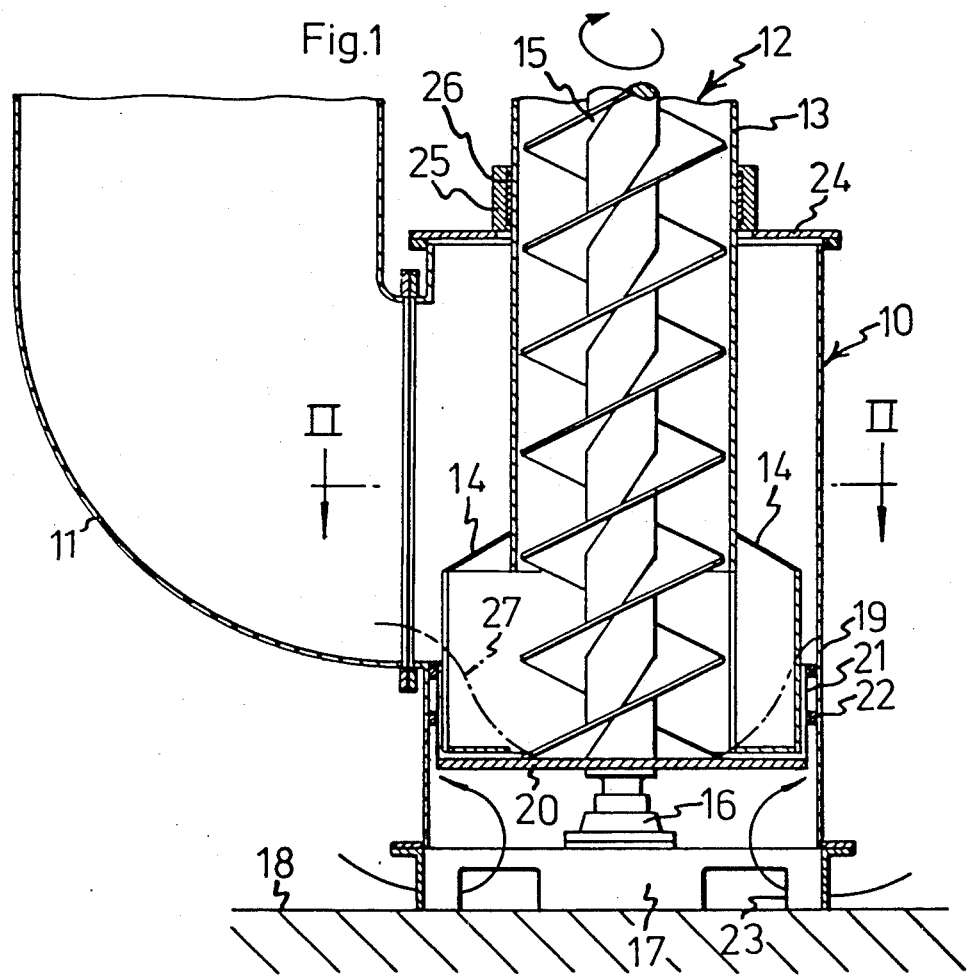
FIG. 1 is a vertical section of a transition housing having a sealing device according to the invention.
Figure 2:
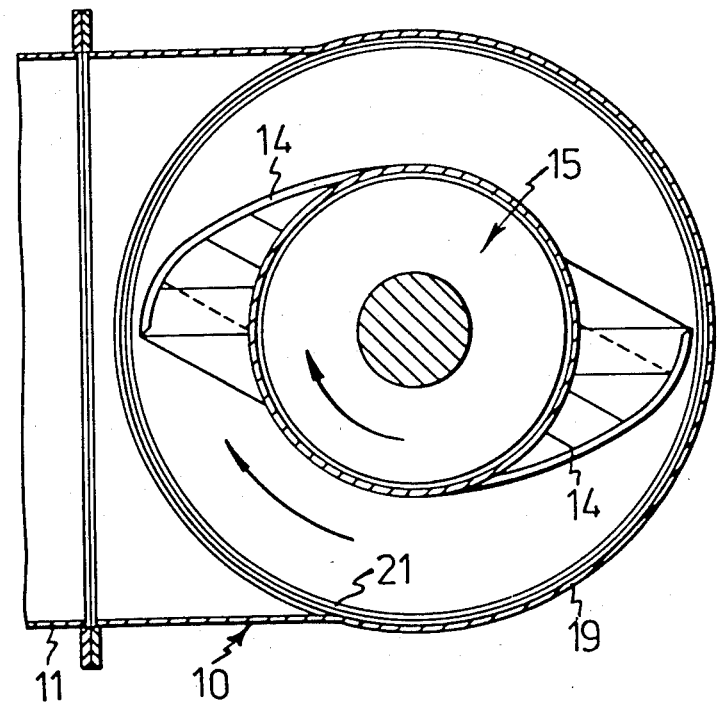
FIG. 2 is a section along line II—II in FIG. 1.
Figure 3:
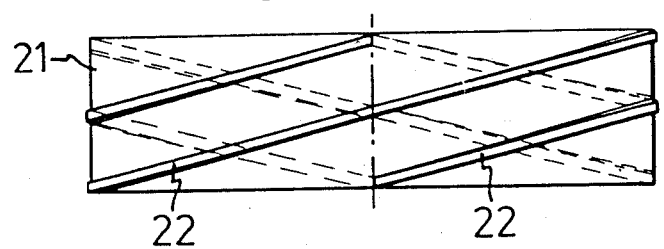
FIG. 3 is a lateral view of a rotary bottom provided in the transition housing and comprised by the device according to the invention.

FIG. 1 shows a transition housing 10 into which an inlet pipe 11 opens. The inlet pipe may be a vertical pipe or an outlet pipe from a storage bin for bulk goods. In the embodiment illustrated, the pipe 11 opens radially into the transition housing into which extends the lower end of a screw conveyor 12, the jacket 13 of which is stationary but may be rotatable and carries, at its lower end, two baffle plates 14 which consequently also are stationary or rotatable. The screw 15 of the screw conveyor is mounted at its lower end in a bearing 16 which is carried by a frame 17 on a base 18. The cylindrical wall 19 of the transition housing is also mounted on the frame 17. The transition housing has a bottom 20 rigidly mounted on the screw conveyor shaft and rotating together therewith. The bottom 20 has an upwardly extending cylindrical wall portion 21, on the outer side of which two helical ridges 22 are secured. These ridges thus rotate together with the cylindrical wall portion 21 and act against the cylindrical wall 19 of the transition housing when the screw conveyor is operating. The helical ridges 22 are so oriented that they endeavour to convey air and, possibly, dust and pulverulent material in a direction from below upwards into the transition housing or the conveyor. By this arrangement, dust, dirt and bulk goods are prevented from penetrating to any appreciable extent into the space between the rotary wall 21 and the stationary wall 19. Impeller action keeps the wall portions subjected to sliding contact free from wearing material so that wear is reduced and the sealing action can be maintained for a longer period of time than otherwise.

To promote the admission of air into the gap between the two cylindrical wall portions 19 and 21, and thus to support cleaning of said gap, the frame 17 is provided with air intakes 23. The upper end of the transition housing is provided with a cover 24 having an upwardly extending cylindrical portion 25 in which a seal 26 is mounted for sealing against the jacket 13 of the screw conveyor. Dash-dot lines 27 signify the bulk goods which is set in rotary motion by the rotary feeder or bottom 20, 21 and is flung, by centrifugal action, against the annular wall 21 and up over the upper edge thereof. It is precisely this material which must be prevented from penetrating down into the gap between the rotary wall portion 21 and the stationary wall portion 19.

In the embodiment illustrated, the sealing device is used together with a co-rotating feeder which, in this case, is a cup-shaped bottom portion, mounted on the screw, of the transition housing. The same arrangement may be used if the feeder is to act directly within a silo, and the material can then enter the feeder from every direction through an annular inlet provided around the feeder. The same arrangement may be utilized for counterrotating feeders, in which case the bottom 20 with the wall portion 21 and the blades mounted thereon is set in a rotary motion opposite to the rotation of the screw. In the embodiment illustrated, the screw blades have been given a uniform pitch along the entire cylindrical wall surface 21. This is not necessary, and the pitch may be varied, if it is desired to vary the velocity of the air or the dust particles along the gap between the cylindrical surfaces. Thus, it may be advantageous to provide on the comparatively short cylindrical surface two helical blades, one of which extends at a slightly greater pitch than the other, such that the air velocity is increased in the direction towards the interior of the conveyor. Furthermore, it is possible, within the scope of this invention, to mount the helical blade or blades on the stationary cylindrical surface, but in that case the effect obtained is less satisfactory than if the blade or blades are mounted on the rotating surface.

What I claim and desire to secure by Letters Patent is:

1. A screw conveyor for transferring bulk goods from a lower level to an upper level, comprising
    a rotary screw shaft having an upper end and a lower end, and with a helical screw thereon, and means to rotate said shaft;
    a bearing means for rotatably supporting said rotary shaft at said lower end;
    a first cylindrical element having a cylindrical sidewall and a bottom wall, said first cylindrical element being fixedly mounted to said rotary shaft for rotation therewith;
    a second cylindrical element surrounding said helical screw and mounted independently of said helical screw so that said helical screw rotates relative to said second cylindrical element; and
    shielding means for said bearing means, said shielding means comprising a third cylindrical element surrounding said first cylindrical element and closely spaced thereto with an annular gap therebetween, and sealing means mounted between said first and third cylindrical surfaces and oriented so that rotation of said first cylindrical element effects a sweeping movement by said sealing means which causes movement of material attempting to enter the annular gap between said first and third cylindrical surfaces to be pushed upwardly in a direction back out of said annular gap.

2. A device according to claim 1, wherein said sealing means comprises at least one helical ridge.

3. A device according to claim 2, wherein said helical ridge is mounted on the exterior of said first cylindrical wall.

4. A device according to claim 1, wherein said rotary shaft is substantially vertically disposed.

* * * * *